United States Patent [19]

Hardy et al.

[11] Patent Number: 4,802,641

[45] Date of Patent: Feb. 7, 1989

[54] METHOD OF PROVIDING RAPID CONVERSION OF AN AIRCRAFT WEAPON CARRIAGE

[75] Inventors: Richard Hardy, Seattle; Frank D. Neumann, Bellevue, both of Wash.

[73] Assignee: The Boeing Company, Seattle, Wash.

[21] Appl. No.: 781,657

[22] Filed: Sep. 30, 1985

[51] Int. Cl.$^4$ .............................................. B64D 1/06
[52] U.S. Cl. .................................. 244/137.4; 89/1.54; 89/1.59
[58] Field of Search ............ 244/137 A, 137 R, 118.1, 244/137.1, 137.4, 130; 89/1.54, 1.59, 1.802, 1.815, 1.816

[56] References Cited

U.S. PATENT DOCUMENTS

| | | | |
|---|---|---|---|
| 2,409,210 | 10/1946 | Jolly | 89/1.54 |
| 2,921,501 | 1/1960 | Parol | 244/137 A |
| 2,975,676 | 3/1961 | Butler | 244/137 A |
| 3,216,322 | 11/1965 | Wenger et al. | 244/137 A |
| 3,611,865 | 10/1971 | Schallert | 244/137 A |
| 3,771,416 | 11/1973 | Ackerman et al. | 244/137 A |
| 4,412,475 | 11/1983 | Hornby | 244/137 A |

FOREIGN PATENT DOCUMENTS 2017617  10/1979  United Kingdom ........... 244/137 A

Primary Examiner—Galen Barefoot
Attorney, Agent, or Firm—Seed and Berry

[57] ABSTRACT

A method of providing rapid conversion of an internal weapon carriage to an external weapon carriage on an aircraft and returning the external carriage to an internal carriage. The method of conversion providing an aircraft with the option of carrying either weapons with large fixed fins or converting to newer type weapons having either smaller fins or fins that can be folded thereon.

7 Claims, 6 Drawing Sheets

METHOD OF PROVIDING RAPID CONVERSION OF AN AIRCRAFT WEAPON CARRIAGE

BACKGROUND OF THE INVENTION

This invention relates to a rapid conversion method of installing weapons on an aircraft and more particularly, but not by way of limitation, to a method of providing conversion of an internal weapon carriage to an external weapon carriage for carrying fixed fin weapons such as air-to-air missiles thereon.

Current air-to-air missiles on tactical aircraft embody the use of weapons with large fins. The large fin weapons do not lend themselves for low drag with a low radar signature internal carriage because of aircraft volume constraints. Therefore, missiles, quite often are carried either on pylons, conformal, semi-submerged or on corners of the fuselage depending on the aircraft and the required launch mode.

Future fighter design requirements place an increased emphasis on reduced drag and signature, thereby making an internal weapon carriage mandatory. Therefore, missiles with smaller or folding fins are being developed which are suitable for internal carriage and these types of weapons are expected to be fielded with future tactical fighters. However, substantial numbers of current weapons with large fixed fins are expected to still be in the future inventory. Therefore, the problem the subject invention addresses is to provide a method so an aircraft can carry both types of weapons efficiently. Rapid conversion in the field must be possible with minimum support equipment.

In the following U.S. Pats.; U.S. Pat. No. 2,780,422 to Maglio, Jr., U.S. Pat. No. 2,958,260 to Anderson, U.S. Pat. No. 3,242,808 to Nelson et al, U.S. Pat. No. 3,468,501 to Baum, U.S. Pat. No. 3,611,865 to Schallert, U.S. Pat. No. 3,771,516 to Ackerman, Jr. et al, U.S. Pat. No. 4,008,645 to Herbert, U.S. Pat. No. 4,106,389 to Walley, U.S. Pat. No. 4,307,650 to Kuesters et al, U.S. Pat. No. 4,440,365 to Holtrop, U.S. Pat. No. 4,448,373 to Bates et al and U.S. Pat. No. 4,520,975 to Blackhurst various types of aircraft weapon mounting equipment, ejector systems and missiles launching apparatus are described. None of these prior art patents provide the advantages of the subject method for providing an aircraft adaptive weapon carriage conversion method as described herein.

SUMMARY OF THE INVENTION

The subject method for providing rapid conversion of a weapon carriage on an aircraft allows the user of an aircraft to quickly convert from weapons mounted internally to weapons mounted externally. Further, the method allows for returning the external weapon carriage system to an internal carriage mode.

The method lends itself for removing internal or semi-submerged weapon launch tubes and replacing them with launch rails for launching fixed fin weapons. Also, the subject method allows for removing quick-connect fairings with built-in doors and mounting external weapons with fixed fins.

One embodiment of the method provides for lowering a folded fin weapon launch tube from a cruise position to a launch position on the aircraft. The folding fin weapon is removed along with the launch tube. The tube is replaced with the launch rail and a fixed fin weapon is installed thereon. The fixed fin weapon is then raised from a launch position to a cruise position on the aircraft.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
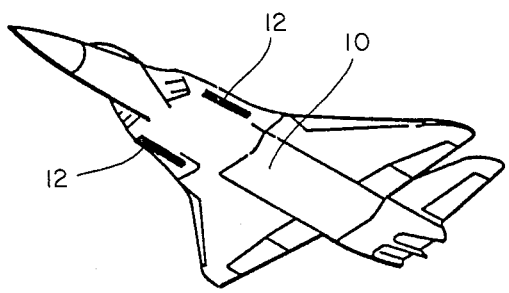
FIGS. 1 through 7 illustrate a method of converting from a semi-submerged weapon tube for holding a folded fin weapon therein to a launch rail for mounting a fixed fin weapon thereon.
Figure 2:
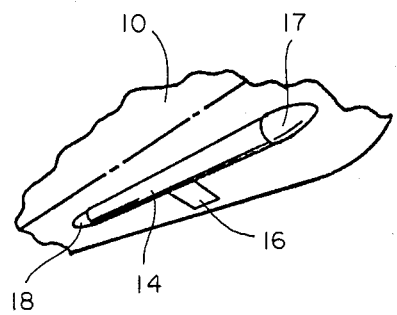
Figure 3:
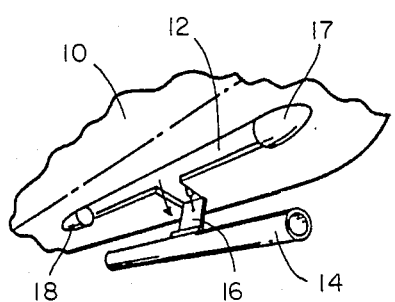
Figure 4:
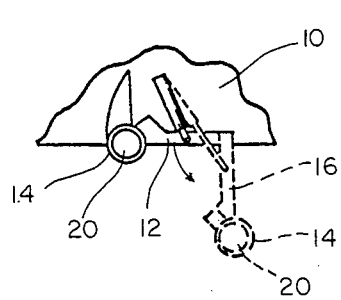

In FIG. 1 an aircraft is designated by general reference numeral 10 having a semi-submerged housing 12 in the bottom of the aircraft 10. An internal launch tube 14 is attached to a hinge deployment arm 16 shown in FIGS. 3 and 4. While the deployment arm 16 is shown the launch tube 14 could be deployed by other linkage arrangements or any other type of deployment mechanism. The arm 16 is secured for raising to the aircraft the tube 14 into a cruise position as shown in FIG. 2. A forward fairing 17 and a rear fairing 18 are positioned on the aircraft at opposite ends of the launch tube 14. In FIG. 3 the launch tube 14 is shown lowered into a launch position. In FIG. 4 a front view of the launch tube 14 is shown both in a cruise position and into a lowered launch position with an internally mounted folded fin weapon 20 received therein.

Figure 5:
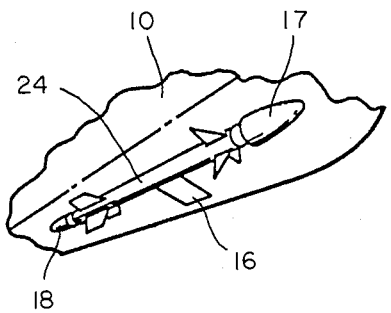
Figure 6:
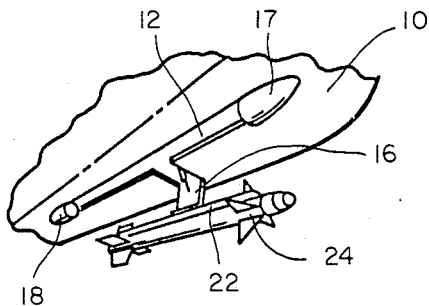
Figure 7:
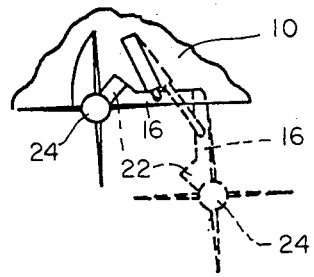

When it is desired to convert the aircraft 10 from launching a folded fin weapon 20 to a fixed fin weapon the launch tube 14 is lowered into a launch position and the tube 14 is removed and replaced with a launch rail 22. The rail 22 is attached to the same hinge deployment arm 16 as shown in FIGS. 6 and 7. A fixed fin weapon 24 is now secured to the launch rail 22 and the weapon 24 is raised into a cruise position as shown in FIG. 5. The weapons 20 and 24 may be air-to-air missiles or any other similar type weapon launched from an aircraft. While the rail 22 is shown it is one of many devices that can be used for deploying an externally mounted weapon.

Figure 8:
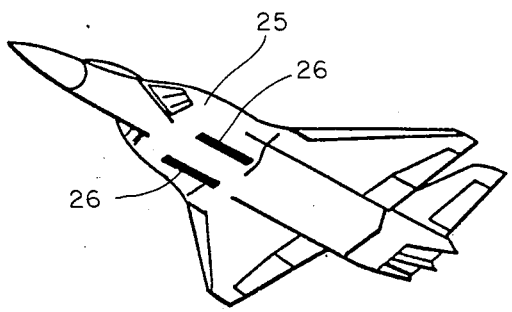
FIGS. 8 through 14 illustrate a method of converting from a semi-submerged launch tube on a corner mount of the aircraft to a rail mount for launching fixed fix weapons.
Figure 9:
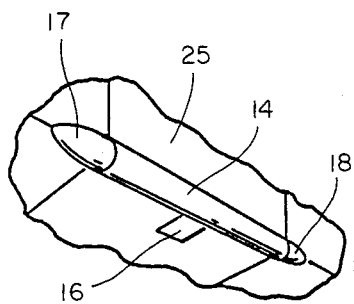
Figure 10:
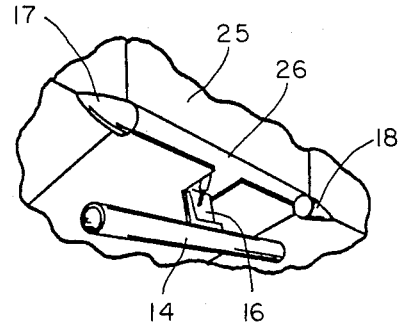
Figure 11:
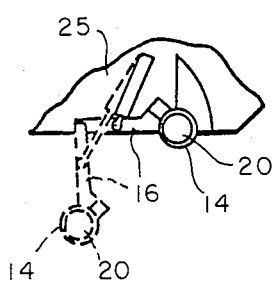
Figure 12:
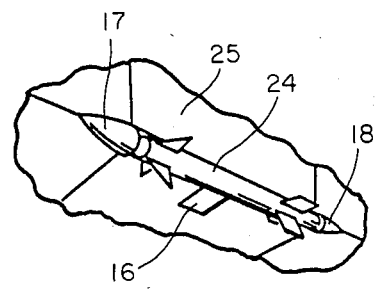
Figure 13:
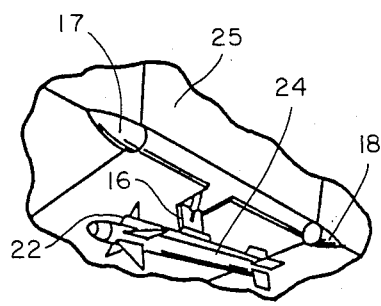
Figure 14:
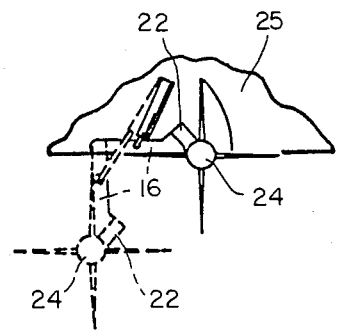

In FIG. 8 a similar aircraft 25 is shown having a corner mount opening 26 for receiving the launch tube 14. The launch tube 14 as shown in FIGS. 10 and 11 is raised and lowered using the hinge deployment arm 16. Inside the tube 14 is a folded fin weapon 20. In FIG. 9 the tube 14 with weapon 20 therein is shown in a cruise position in the corner opening 26. This opening 26 also includes a forward fairing 17 and rear fairing 18. In FIGS. 12, 13 and 14 the corner mount weapon carriage has again been converted to an external launch by removing the tube 14 and installing the launch rail 22. The fixed fin weapon 24 is installed as shown in a launch position in FIGS. 13 and 14 and raised by the deployment arm 16 into a cruise position as shown in FIG. 12.

Figure 15:
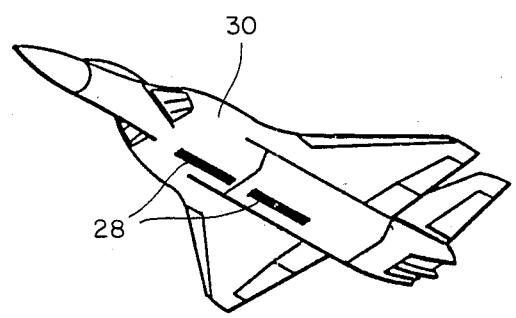
FIGS. 15 through 21 illustrate a fighter aircraft with a semi-submerged internal weapon with folded fins and quick-connect fairings with built-in doors and the removal of the fairings for launching a fixed fin weapon.
Figure 16:
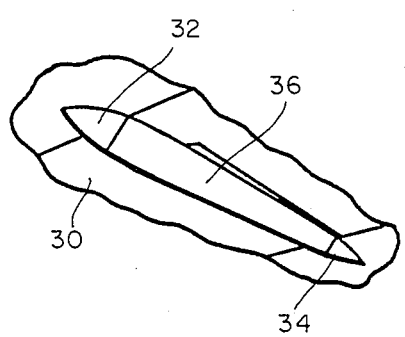
Figure 17:
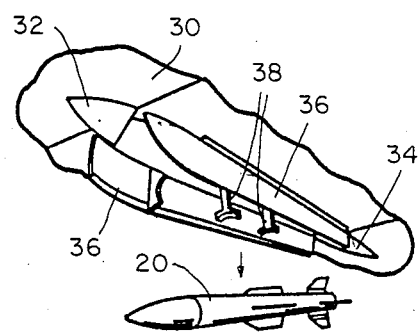
Figure 18:
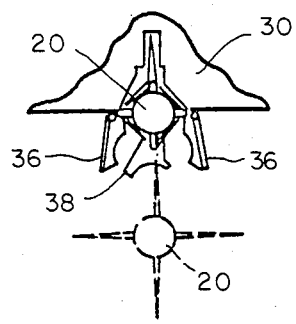

In FIG. 15 the method of providing a rapid conversion from folded fin to fixed fin weapons is shown used in conjunction with quick-connect housing 28 in the bottom of an aircraft 30. The quick-connect housing 28 consists of front fairing 32 and rear fairing 34 with built-in doors 36. The doors 36 are shown in an open position in FIGS. 17 and 18. Ejectors 38 which are used for holding and releasing the weapon 20 are mounted inside the aircraft 30. In FIG. 16 the weapon 20 is shown received inside the housing 28 with the doors 36 in a closed cruise position. In FIG. 17 the dors 36 are in an open position and the weapon 20 released from the ejectors 38. FIG. 18 shows the front view of the doors 36 in an open position with the ejector 38 having released the weapon 20.

Figure 19:
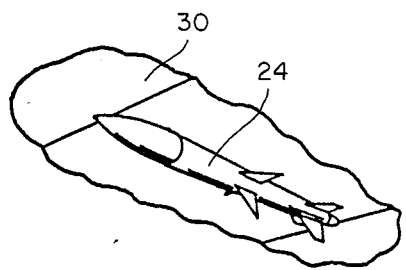
Figure 20:
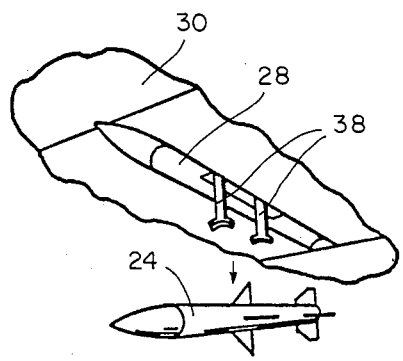
Figure 21:
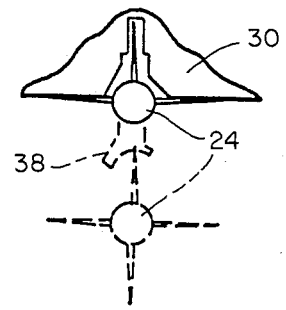

In FIGS. 19, 20 and 21 the quick-connect housing 28 with built-in doors 36 and fairings 32 and 34 have been removed and the fixed fin weapon 24 engaged by the ejector 38. FIG. 19 illustrates the fixed fin weapon 24 in a cruise position and in FIG. 20 the weapon launched from the ejectors 38. As mentioned above in FIGS. 19, 20 and 21 the housing 28 with front and rear fairings 32, 34 and the doors 36 have been removed for receiving the external fixed fin weapon 24. The housing 28 including fairings, doors and door actuators can be packaged as a kit for rapid conversion of the aircraft in the field for carrying either type of the weapon 20 and 24 depending on the requirement.

Figure 22:
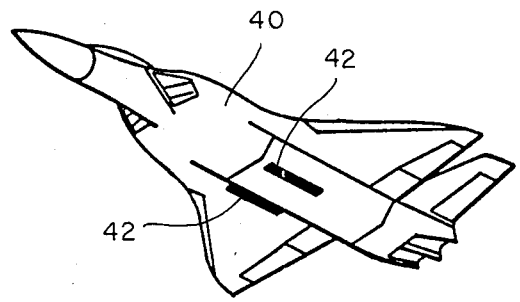
FIGS. 22 through 28 illustrate the aircraft with quick-connect fairings corner mounted on the bottom of the aircraft for conversion to an external fixed fin weapon.
Figure 23:
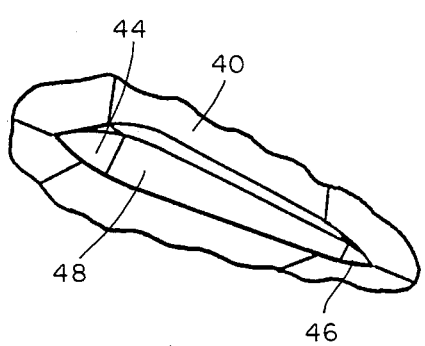
Figure 24:
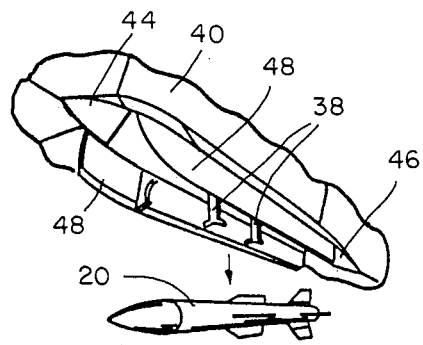
Figure 25:
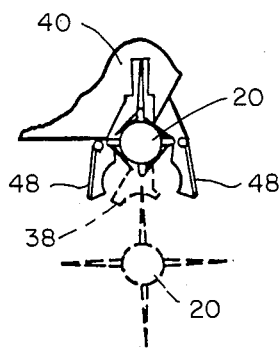

In FIG. 22 an aircraft 40 is shown with corner mount housing 42 consisting of a front fairing 44 and a rear fairing 46 with folding doors 48. Again, a pair of launch ejectors 38 are used for securing the folded fin weapon 20 received inside the housing 42 and folding doors 48 in a closed position. FIG. 24 illustrates the doors 48 in an open position with the folded fin weapon 20 released from the ejectors 38. FIG. 25 illustrates a front view of the weapon 20 in a launch position.

Figure 26:
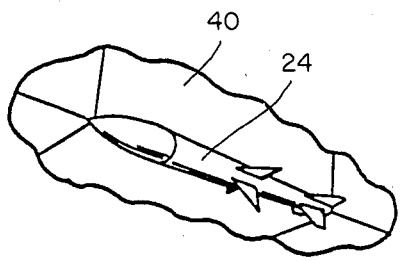
Figures 27, 28:
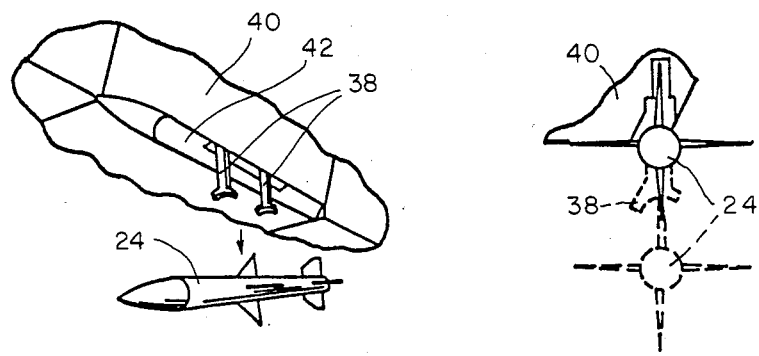

FIGS. 26, 27 and 28 the corner mount housing 42 consisting of fairings 44 and 46 and folding doors 48 have been removed for receiving the fixed fin weapon 42. FIG. 26 illustrates the fixed fin weapon 24 in a cruise position. FIGS. 27 and 28 illustrate the fixed fin weapon ejected using ejectors 38 and the weapon 24 in a launch position.

From reviewing the above drawings, it can be appreciated that the subject invention provides a method for rapid conversion of an internal weapon carriage to an external weapon carriage on an aircraft with the aircraft having the ability to carry both folded fin weapons and fixed fin weapons depending on the weapons in the current inventory and field requirements.

Changes may be made in the construction and arrangement of the parts or elements of the embodiments as described herein without departing from the spirit or scope of the invention defined in the following claims.

What is claimed is:

1. A method of providing rapid conversion of an internal weapon carriage for folded fin or relatively small fin weapons to an external weapon carriage for relatively large fixed fin weapons carried in a semi-submerged configuration, said weapon carriage having a mounting mechanism adapted to mate with mounting mechanisms of said weapons, the steps comprising:

removing a folded or relatively small fin weapon from a removable quick-connect weapon housing if one is therein;

removing the quick-connect housing consisting of front and rear fairings with built-in doors therebetween from the aircraft;

installing a relatively large fixed fin weapon on said weapon carriage, said large fixed fin weapon having a mounting mechanism mating with the mounting mechanism on said weapons carriage, said relatively large fin weapon occupying the space that is occupied by said removable housing when folding or relatively small fin weapons are carried on said weapon carriage; and raising the weapon from a launch position to a cruise position on the aircraft, with at least one fin of said large fixed fin weapon projecting from said aircraft.

2. The method as described in claim 1, further including the following steps:

removing the large fixed fin weapon from the weapons carriage;

installing the quick-connect housing with built-in doors and fairings to the aircraft; and attaching the weapon with folded or relatively small fins to the weapons carriage and closing the built-in doors for returning to a cruise position.

3. The method as described in claim 1 wherein the quick-connect housing with built-in doors and fairings are received adjacent a semi-submerged housing in the bottom of the aircraft.

4. The method as described in claim 1 wherein the quick-connect housing with built-in doors and fairings are connected adjacent a corner mount opening in the bottom of the aircraft.

5. An aircraft weapons system for internally carrying a folding or relatively small fin weapon and carrying a fixed, relatively large fin weapon in a semi-submerged configuration, said system comprising:

an internal weapons ejector having mounting means;

a relatively large fin weapon having mounting means adapted to be engaged by the mounting means of said weapon ejector, said relatively large fin weapon being carried by said weapon ejector in a semi-submerged condition, with at least one of said fins projecting externally from the fuselage of said aircraft;

a folding or relatively small fin weapon having mounting means adapted to be engaged by the mounting means of said weapon ejector, said folding or relatively small fin weapon being internally carried by said weapon ejector; and a removable housing assembly removably mounted on an external surface of said aircraft said housing assembly including a front fairing, a rear fairing and folding doors therebetween to enclose said weapons ejector when said folding or relatively small fin weapon is mounted on said weapon ejector and removed from said aircraft when said fixed, relatively large fin weapon is mounted to said weapon ejector said relatively large fin weapon occupying the space that is occupied by said removable housing when folding or relatively small fin weapons are carried on said ejector.

6. The aircraft weapons system of claim 5 wherein said fixed, relatively large fin weapon is semi-submerged in a generally planar portion of said fuselage when said fixed, relatively large fin weapon is in its cruise position.

7. The aircraft weapons system of claim 5 wherein said fixed, relatively large fin weapon is received in a corner of the fuselage of said aircraft when said fixed, relatively large fin weapon is in its cruise position.

* * * * *